United States Patent [19]
Badertscher et al.

[11] Patent Number: 6,120,176
[45] Date of Patent: *Sep. 19, 2000

[54] APPARATUS FOR HEAT TREATING A FOOD PRODUCT

[75] Inventors: Ernest Badertscher; Gerald Bernard, both of Orbe; Paul-Henri Poget, Bretonnieres; Nadine Tripier, Baulmes, all of Switzerland

[73] Assignee: Nestec S.A., Vevey, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 09/160,256

[22] Filed: Sep. 25, 1998

Related U.S. Application Data

[62] Division of application No. 08/767,984, Dec. 17, 1996, Pat. No. 5,863,587.

[30] Foreign Application Priority Data

Dec. 22, 1995 [EP] European Pat. Off. ............ 95203622

[51] Int. Cl.[7] ........................................... B01F 7/10
[52] U.S. Cl. .......................... 366/147; 366/192; 366/316; 99/348; 99/453
[58] Field of Search ................. 99/348, 453; 366/65–66, 366/96–99, 168.1, 172.1, 172.2, 176.1, 292, 192, 305, 315, 316, 317, 325.1, 328.2, 147; 426/510, 511, 519

[56] References Cited

U.S. PATENT DOCUMENTS

| | | |
|---|---|---|
| Re. 26,257 | 8/1967 | Altman . |
| 1,639,828 | 8/1927 | Wheeler et al. . |
| 1,727,753 | 9/1929 | DeBethune ........................... 366/316 X |
| 1,993,446 | 3/1935 | Huff ..................................... 366/316 X |
| 2,092,992 | 9/1937 | Thalman . |
| 2,139,871 | 12/1938 | Wilson et al. ....................... 366/316 X |
| 2,534,648 | 12/1950 | Wilbur . |
| 2,589,288 | 3/1952 | Ryan . |
| 2,740,696 | 4/1956 | Longwell ............................. 366/316 X |
| 2,774,577 | 12/1956 | Anderson et al. ................... 366/316 X |
| 2,798,698 | 7/1957 | Dooley ................................. 366/316 X |
| 2,914,385 | 11/1959 | Massey et al. . |
| 2,960,318 | 11/1960 | Caillaud .............................. 366/305 X |
| 3,062,627 | 11/1962 | Zuiderweg .......................... 366/316 X |
| 3,336,137 | 8/1967 | Hickey ................................. 99/353 X |
| 3,348,972 | 10/1967 | Taylor . |
| 4,160,002 | 7/1979 | Janovtchik . |
| 4,205,094 | 5/1980 | Baird et al. . |
| 4,874,248 | 10/1989 | Luetzelschwab .................... 366/316 X |
| 4,915,509 | 4/1990 | Sauer et al. ......................... 366/317 X |
| 4,974,292 | 12/1990 | Currier et al. ...................... 366/316 X |
| 5,362,292 | 11/1994 | Borgstrom et al. . |
| 5,395,569 | 3/1995 | Badertscher et al. . |

FOREIGN PATENT DOCUMENTS

| | | |
|---|---|---|
| 0 196 464 | 10/1986 | European Pat. Off. . |
| 0 601 329 | 6/1994 | European Pat. Off. . |
| 2658393 | 8/1991 | France . |
| 1026107 | 3/1958 | Germany ............................. 366/316 |
| 2354296 | 5/1975 | Germany . |
| 107801 | 11/1950 | New Zealand . |
| 173615 | 11/1975 | New Zealand . |
| 627 806 | 8/1978 | U.S.S.R. . |
| 1658 968 | 6/1991 | U.S.S.R. . |
| WO 91/13099 | 9/1991 | WIPO . |

*Primary Examiner*—Charles E. Cooley
*Attorney, Agent, or Firm*—Pennie & Edmonds LLP

[57] ABSTRACT

An apparatus for heat treating a food product by injection of steam therein in order to provide a sterilization, pasteurization and/or a homogenization of the product. The apparatus comprises a mixing chamber comprising a steam injection inlet, a product inlet and an outlet for the treated product, a rotatable shaft disposed within the mixing chamber, a plurality of discs, each disc comprising at least one product passage opening, wherein the discs are disposed substantially co-axially upon the shaft, and a device for rotating the shaft with the discs.

18 Claims, 2 Drawing Sheets

APPARATUS FOR HEAT TREATING A FOOD PRODUCT

This is a division of application Ser. No. 08/767,984, filed Dec. 17, 1996, U.S. Pat. No. 5,863,587.

TECHNICAL FIELD

The present invention relates to an apparatus for treating a fluid such as for sterilising and/or pasteurising and/or homogenising fluid products. More particularly, it relates to an apparatus for sterilising, pasteurising and/or homogenising a fluid product by injection of steam into the fluid product.

BACKGROUND ART

Direct steam injection is, e.g., used in the food industry for pasteurising or sterilising of milk or cereal products. Various types of apparatus for pasteurising or sterilising fluid food products by injection of steam are known. The present invention relates to a method and apparatus wherein steam is injected into a product stream.

SUMMARY OF THE INVENTION

Whereas direct steam injection does not raise particular problems for low viscosity fluids such as milk, whey and cream, the pasteurisation of, e.g., infant cereal based food, with far higher viscosity, e.g., comprising 20% starch, is very difficult to control in a homogeneous mixing. An inhomogeneous mixing will mean that temperature varies through the product mass and consequently the product is not homogeneously heat treated. In order to safeguard sufficiently heat treatment of the product, i.e., to make sure that all parts of the product mass are heated to a high enough temperature, such as is crucial in pasteurising and sterilising processes, additional steam will need to be injected. This additional steam consumption is expensive and undesirable.

Homogenisation and mixing may be improved by passing the product through a venturi shaped nozzle in order to increase turbulence and velocity of the product, however, this may not provide a sufficient enough mixing. Alternatively, a mechanical mixing of the product and the steam may be necessary.

Mixing of the product and steam may be obtained by passing the product through a static mixer. However, substantial wear of the static mixer is likely to result from the passage of highly viscous products therethrough. Such static mixer will therefore have to frequently be replaced, which increases production costs. Alternatively, a screw may be used for mixing and for building up a pressurised product. However, the product creates a large momentum on the screw when rotated, and hence considerable motor capacity is required for the mixing.

The present invention overcomes the above mentioned difficulties by utilising a rotatable shaft along which a plurality of perforated discs comprising product passage openings, are co-axially disposed. Accordingly, the invention provides an improved apparatus and process which accommodates a good mixing and thus a homogeneous heating together with a surprisingly high homogenisation. Among other things, the invention has the following advantages:

Lowered steam consumption by ensuring a sufficiently homogeneous mixing.

Improved mixing and homogenising by providing a rotatable shaft along which a plurality of perforated discs comprising product passage openings are co-axially disposed and by passing the product through the openings while rotating the discs, Shock effect due to flowing product hitting the discs and the passage of the product through the opening resulting in turbulent flow and mixing, and homogenisation.

Cutting through the product mass by rotating the discs to increase the homogenisation of the product.

Reducing motor capacity requirement due to a reduced momentum from the product surrounding the shaft and the disc.

Optimising heat distribution by providing an initial homogenising of the product where after the steam is injected and the product and steam are mixing together for a condensation of the steam and a heat transfer to the product.

Accordingly, in a first aspect the present invention relates to an apparatus for heat treating a fluid product by injecting steam into the fluid product, the apparatus comprising a mixing chamber comprising a steam injection inlet, a product inlet, and an outlet for the treated product, a rotatable shaft disposed within the mixing chamber, a plurality of discs each comprising at least one product passage opening, the discs being disposed substantially co-axially on the shaft, and means for rotating said shaft with the discs.

It is preferred that the steam be injected at sonic velocity. This will increase the turbulence in the steam and a good mixing is obtained. Sonic velocity of steam can be obtained by letting the fluid pass through a venturi valve while having upstream a pressure which is approximately twice that downstream. The steam velocity after the valve will then be about 450 m/sec.

Advantageously, at least on the downstream end of the mixing chamber only a small gap is left between the discs and the mixing chamber walls. This results in substantially the entire product mass passing through the product passage opening in the discs and substantive homogenising of the fluid product and mixing of steam and product. Conveniently, at least the downstream part of the mixing chamber is substantially cylindrical and the rotatable shaft is substantially co-axially fitted within the mixing chamber.

One or more steam injectors may be positioned along the shaft for injection of steam, via the steam injection inlet, into product passing through the mixing chamber. The rotating shaft with discs will, while the product is pumped through the mixing chamber, cut the product stream and act as a shock generator such as discussed above. The shaft and discs will, contrary to a screw, not in any substantial way add to the advancing movement of the product through the mixing chamber. The product will be pumped into the chamber and advanced by further product being supplied. The shaft may be provided with replaceable discs or the shaft and discs may be made integral. The shaft may be rotated by any conventional motor.

Depending on the required throughput, heating, mixing and homogenisation, the number of discs and the openings therein may be varied. The more discs provided along the products path from the product inlet to the outlet for the treated product the more homogenising and mixing will be provided. Although the number of discs can be freely chosen, for practical purposes the number of discs can be from 2 to 20, preferably 5 to 15. The diameter of the product passage openings is preferably in the range of from about 2 to 10 mm, more preferably 6 mm. This will provide a velocity into the product passage openings of between about 40 and 200 m/s, preferably 100 m/s.

In the present context a fluid product is understood to be a solution or suspension, e.g. aqueous, having a viscosity of the order of about 1000 to 100,000 mPa.s.

The fluid product is pumped into the mixing chamber through the product inlet. It is preferred that the fluid product is first passed through at the product passage opening(s) in at least one and preferably 3 rotating discs before steam is injected into the product. This gives an initially homogeneous slurry which is then pressed forward and subjected to steam injection heating, mixing, and homogenising.

The homogenising effect is obtained by the shearing of the product passing through the openings of the disks. In the particular case of milk-containing products, a good homogenising effect is obtained by the arrangement through shearing of the fatty globules.

The steam injection nozzle is connected to a feed pipe feeding steam under pressure, preferably between about 10 and 15 bar. The product injection nozzle is connected to a feed pipe feeding the fluid product to be treated. The outlet from the apparatus is by a back-pressure valve connected to a holding pipe. The back-pressure valve regulates the pressure through the outlet and creates a back pressure in the mixing chamber to maintain the temperature in the mixing chamber. Poor control of the back pressure results in loss of steam which gives an uneconomic production. The back-pressure valve may advantageously be of the membrane type. Advantageously, two pack-pressure valves may be used, e.g., CPM or APC valves from Tetra-Laval.

In another aspect, the invention relates to a method for heat treating a fluid product by injecting steam into the fluid product, the method comprising the steps of supplying a fluid product into a mixing chamber through a product inlet, injecting steam into the fluid product through a steam injection inlet in the mixing chamber, in which mixing chamber being disposed a rotatable shaft and a plurality of discs each comprising at least one product passage opening, the discs being disposed substantially co-axially on the shaft, while passing at least part of the fluid product through the product passage openings while rotating the shaft with the discs, and discharging the treated fluid product through an outlet in the mixing chamber.

In a further aspect, the invention relates to a shaft to be used for homogenising and mixing in an apparatus or a process for heating by steam injection a fluid product, the shaft comprising a plurality of discs each comprising at least one product passage opening, the discs being disposed substantially co-axially on the shaft.

BRIEF DESCRIPTION OF THE DRAWINGS

The invention will now be described in greater detail with reference to the accompanying drawings given by way of example showing an embodiment of the invention and in which.

DETAILED DESCRIPTION OF THE PREFERRED EMBODIMENTS

Figure 1:
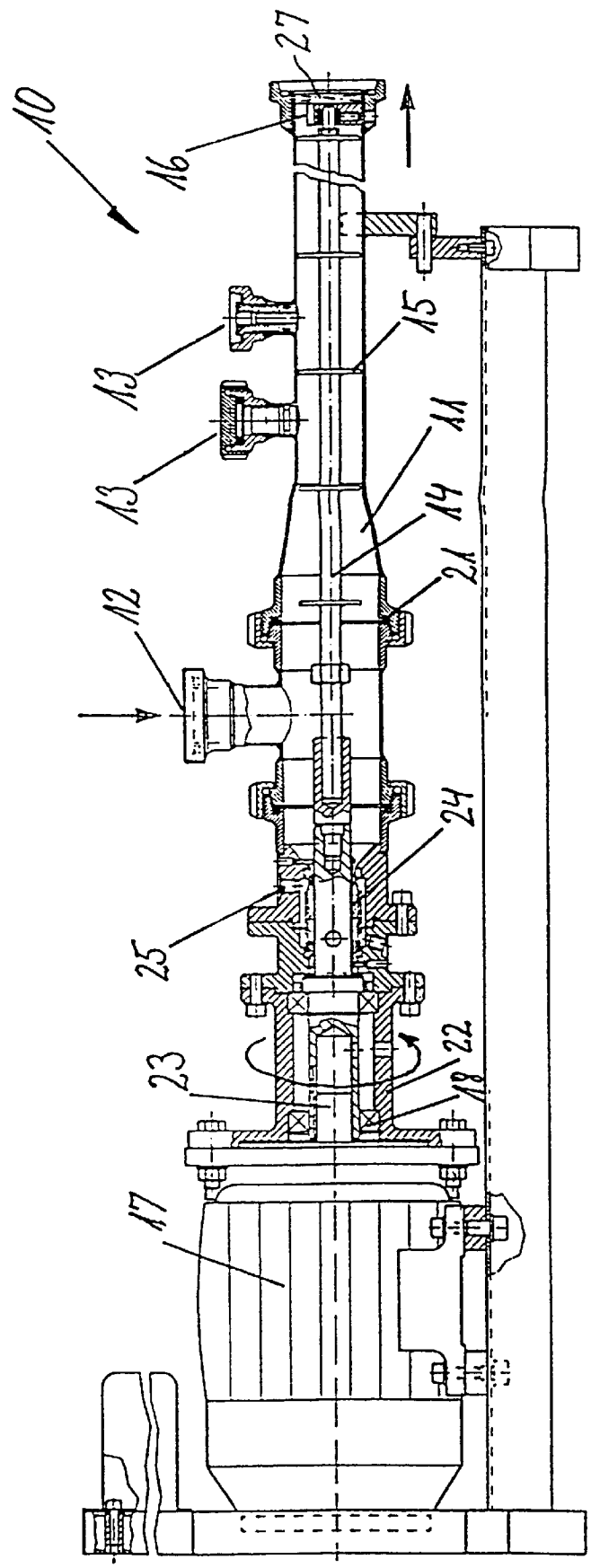
FIG. 1 is a schematic illustration of the principle elements of the apparatus according to the invention.

FIG. 1 shows the apparatus 10 according to the invention. The apparatus 10 comprises a mixing chamber 11 defined by walls 21 wherein a steam injection inlet 13, a product inlet 12, and an outlet 16 are formed. A rotatable shaft 14 is disposed within the mixing chamber 11 and mounted in bearings 18 within an intermediate support 22. It is connected to an output rotary shaft 23 of a motor 17 which drives the rotation of the shaft 14. The motor may, e.g., be a 1.1 Kw, 1400 t/min motor. A sealing 24 is provided to prevent fluid product from escaping the mixing chamber 11. This sealing 24 is cooled by means of water supplied via a water inlet 25.

Figure 2:
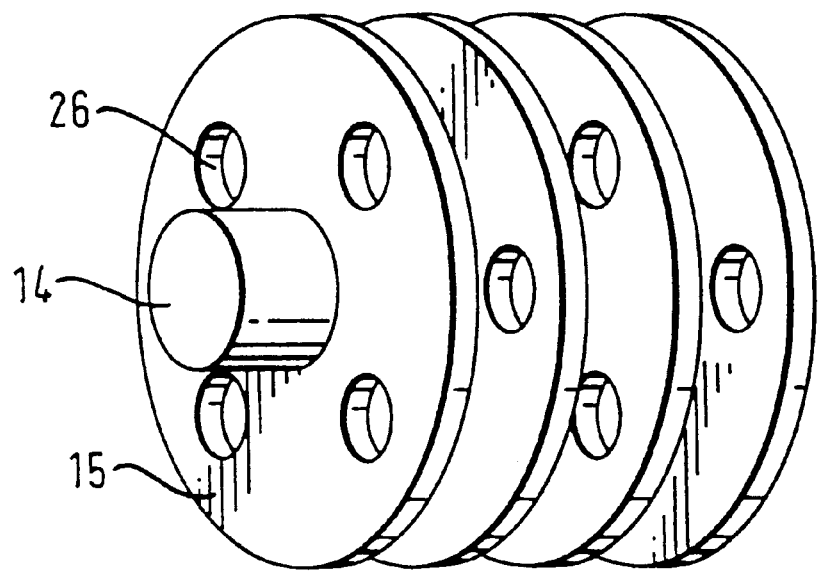
FIG. 2 and FIG. 3 are schematic illustrations of the shaft with discs for such an apparatus.
Figure 3:
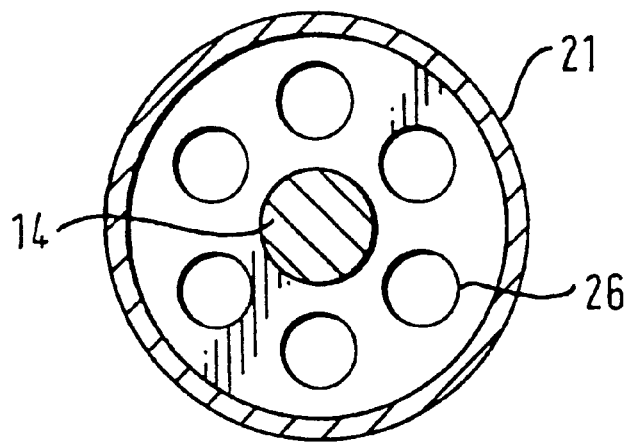

The shaft 14 is provided with a plurality of discs 15. Each disc 15 comprises at least one product passage opening. The discs are disposed substantially co-axially on this shaft. FIG. 2 shows a perspective view of the discs 15 mounted on the shaft 14. These discs include product passage openings 26. FIG. 3 shows a cross-sectional view of the shaft 14 with a disc 15 fitted within the chamber 11.

The flow through the outlet 16 is regulated by means of a back-pressure valve 27. To use the apparatus a steam inlet 13 is connected to steam injector and a feed pipe for supplying steam under pressure, and the product inlet is connected to a feed pipe and a pump for supplying the fluid product to be treated under pressure. The outlet is preferably connected to a holding pipe by back-pressure valve 27.

EXAMPLE

The following example illustrates the substantial and surprising steam reduction obtained with the apparatus according to the invention when compared with processing of a similar fluid product in a steam injection nozzle, i.e., a nozzle wherein both streams of steam and fluid product are injected into a mixing chamber counter-currently without any further mechanical mixing (S&P injection). The apparatus according to the invention comprises a shaft with 10 discs. The diameter of the discs was 44 mm and each disc had 6 product passage openings of 8 mm diameter. The example shows test results of heat treatment of fluid products with varying solid matter content. The products were heated to 140° C.:

|         | Solid Matter | Steam Consumption (Kg/Hour) | |
|---------|--------------|-----------------|-----------|
| Product | Ts soup %    | S & P Injection | Invention |
| A       | 60–62%       | 320             | 195       |
| B       | 56–58%       | 330             | 195       |
| C       | 58–60%       | 330             | 195       |
| D       | 58–60%       | 335             | 200       |
| E       | 60%          | 350             | 215       |
| F       | 56–58%       | 355             | 200       |

Thus, the apparatus of the invention utilizes only about 55 to 65% as much steam as the conventional device. This results in a savings of 40 to 45% in the amount of steam needed. Depending upon the specific configuration of the device of the invention and the solids content of the products to be treated, steam savings of between about 25 and 50% are easily achieved.

What is claimed is:

1. A fluid food product heating apparatus, said apparatus comprising:

a mixing chamber that includes a steam injection inlet through which steam is injected into the chamber, a product inlet through which a fluid food product enters the chamber, wherein said steam is mixed with and heat treats the fluid food product in the mixing chamber to form a homogeneous mixture, and an outlet by which the homogeneous mixture exits said chamber, means for supplying steam to said steam injection inlet, a rotatable shaft disposed within said mixing chamber, a plurality of discs, each comprising at least one product passage opening, said discs being disposed substantially co-axially on said shaft, and means for rotating said shafts with said discs, wherein said steam and said food product are mixed within said mixing chamber by passing at least part of the food product through the product passage openings while rotating said shaft and discs, and wherein at least on the downstream end of the mixing chamber the gap between the discs and the mixing chamber walls is such that substantially the entire product mass passes through the product passage opening in the discs, so as to cause a shearing of the food product passing through the product passage openings and a turbulent flow of the fluid food product toward the outlet while promoting homogenization and heat distribution by said steam throughout the fluid food product.

2. Apparatus according to claim 1, wherein the apparatus comprises a back-pressure valve for regulating the flow of the treated product through the outlet.

3. Apparatus according to claim 1, wherein the mixing chamber is substantially cylindrical and the rotatable shaft is substantially co-axially disposed within said mixing chamber.

4. Apparatus according to claim 1, wherein at least one disc is disposed between the product inlet and the steam inlet.

5. Apparatus according to claim 1, wherein a plurality of steam inlets are positioned along the rotatable shaft.

6. Apparatus according to claim 1, wherein the apparatus is provided with 2 to 20 discs.

7. Apparatus according to claim 6, wherein the apparatus is provided with 5 to 15 discs.

8. Apparatus according to claim 1, wherein each disc is provided with 2 to 50 product passage openings.

9. Apparatus according to claim 1, wherein the product passage openings have a diameter in the range from about 2 to 10 mm.

10. Apparatus according to claim 9, wherein the product passage openings have a diameter of about 6 mm.

11. Apparatus according to claim 1, wherein said discs are integral with said rotatable shaft.

12. Apparatus according to claim 1, wherein said steam supplying means comprises at least one steam injector.

13. Apparatus according to claim 1, wherein said discs are removable from said shaft.

14. A food product heating apparatus, said apparatus comprising:

a mixing chamber that includes a steam injection inlet through which steam is injected into the chamber, a product inlet through which a food product enters the chamber wherein said steam is mixed with and heat treats the food product in the mixing chamber to form a homogeneous mixture, and an outlet by which the homogeneous mixture exits said chamber, means for supplying steam to said steam injection inlet, a rotatable shaft disposed within said mixing chamber, a plurality of discs, each comprising at least one product passage opening, said discs being disposed substantially co-axially on said shaft, and means for rotating said shafts with said discs, wherein said steam and said food product are mixed within said mixing chamber by passing at least part of the food product through the product passage openings while rotating said shaft and discs, and wherein at least on the downstream end of the mixing chamber the gap between the discs and the mixing chamber walls is such that substantially the entire product mass passes through the product passage opening in the discs, so as to cause a shearing of the food product passing through the product passage openings and a turbulent flow of the food product toward the outlet while promoting homogenization and heat distribution by said steam throughout the food product.

15. Apparatus according to claim 14, further comprising a back-pressure valve for regulating the flow of treated product through the outlet.

16. Apparatus according to claim 14, wherein the mixing chamber is substantially cylindrical and the rotatable shaft is substantially co-axially disposed within said mixing chamber.

17. Apparatus according to claim 14, wherein a plurality of steam inlets are positioned along the rotatable shaft.

18. Apparatus according to claim 14, wherein said discs are integral with said rotatable shaft.

* * * * *